United States Patent [19]

Wakabayashi et al.

[11] Patent Number: 5,328,894

[45] Date of Patent: Jul. 12, 1994

[54] FOOD-PRESERVING AGENT

[75] Inventors: Hidechika Wakabayashi; Yasuo Sugihara; Akira Hosomi; Futoshi Nakaya, all of Tokyo, Japan

[73] Assignee: Mitsubishi Gas Chemical Company, Inc., Tokyo, Japan

[21] Appl. No.: 846,177

[22] Filed: Mar. 5, 1992

[30] Foreign Application Priority Data

Mar. 22, 1991 [JP] Japan .................................. 3-083586

[51] Int. Cl.$^5$ .......................... B01J 20/22; A23B 4/00
[52] U.S. Cl. ........................................ 502/1; 502/62; 502/401; 426/133; 426/323
[58] Field of Search ...................... 502/1, 401, 406, 62; 426/133, 323, 324

[56] References Cited

FOREIGN PATENT DOCUMENTS

| | | | |
|---|---|---|---|
| 0457457 | 11/1991 | European Pat. Off. ............ | 502/401 |
| 0079869 | 5/1982 | Japan .................................. | 426/133 |
| 61-285973 | 12/1986 | Japan . | |
| 62-6665 | 1/1987 | Japan . | |
| 62-40273 | 2/1987 | Japan . | |
| 62-87079 | 4/1987 | Japan . | |
| 62-102829 | 5/1987 | Japan . | |
| 62-186939 | 8/1987 | Japan . | |
| 62-186941 | 8/1987 | Japan . | |
| 62-186942 | 8/1987 | Japan . | |
| 1-94994 | 4/1989 | Japan . | |

OTHER PUBLICATIONS

Patent Abstracts of Japan, vol. 11, No. 150, May 15, 1987 & JP-A-61 285 973.
Patent Abstracts of Japan, vol. 11, 229, Jul. 24, 1987 & JP-A-62 040 273.
Chemical Abstracts, vol. 73, No. 23, Dec. 7, 1970: 12890-1.
Chemical Abstracts, vol. 107, Sep. 7, 1987: 78280p.

*Primary Examiner*—Carl F. Dees
*Attorney, Agent, or Firm*—Armstrong, Westerman, Hattori, McLeland & Naughton

[57] ABSTRACT

A food-preserving agent comprising an oxygen absorbent and a compound represented by the following structural formula (I):

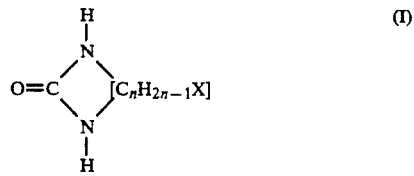

, wherein n is an integer of 2 to 4 and X is H or $CH_3$, can remove generated acetaldehyde effective, thereby preserving food without any fear of disagreeable odor for a long duration.

2 Claims, No Drawings

FOOD-PRESERVING AGENT

BACKGROUND OF THE INVENTION

This invention relates to a food-preserving agent and a method for preserving food with the food-preserving agent, and more particularly to a food-preserving agent capable of removing acetaldehyde and a method for preserving food with the said food-preserving agent.

Heretofore, methods for preserving food in sealed packages, based on a vacuum treatment or replacement with an anaerobic gas such as a nitrogen gas, etc. have been developed. More recently, methods for preserving food in sealed packages, based on filling with an oxygen absorbent, ethanol vapors, or an ethanol-transpiring agent, or a combination thereof have been proposed.

Particularly, methods for preserving food in sealed packages based on simultaneous use of an oxygen absorbent and ethanol vapors or an ethanol-transpiring agent have been regarded as one of ideal methods for preserving food, because the former is effective for the control of aerobic bacteria and the latter is effective for the control of anaerobic bacteria.

However, it has been found that these methods have a problem, that is, generation of acetaldehyde by contact of ethanol vapors or liquid with an oxygen absorbent and the resulting oxidation of ethanol. Furthermore, it has been found that the generation of acetaldehyde is not only due to the simultaneous use of the oxygen absorbent and ethanol, but also due to food itself, as disclosed in Japanese Patent Application Kokai (Laid-open) No. 62-40273. The generated acetaldehyde itself is a substance causing a disagreeable odor, and its toxicity also is a problem.

Practical steps for removing the generated acetaldehyde rapidly have been required to develop and thus extensively investigated. As a result, the following substances have been so far proposed to remove the acetaldehyde, in Japanese Patent Application Kokai No. 61-285973 and 62-40273 et al.

(1) Ammonium salts such as ammonia alum, ammonium sulfate, etc.
(2) Urea
(3) Amino acids such as lysin, arginine, glycine, glutamine, etc.
(4) Proteins such as albumen, casein, gluten, etc.
(5) Peptides such as peptones, gelatin, etc.
(6) Inorganic alkali metal hydroxides such as sodium hydroxide, etc.
(7) Sulfites such as sodium sulfite, etc.
(8) Bisulfites such as sodium bisulfite, etc.
(9) Thiosulfates such as sodium thiosulfate, etc.
(10) Sulfates such as sodium sulfate, etc.
(11) Aromatic aminosulfonic acids, their alkali metal salts and alkaline earth metal salts such as sulfanilic acid, sodium sulfanilate, etc.
(12) Weakly basic ion exchange resins The substances (1) and (2) are preferable with respect to the safety and cost, but have a problem in the ability to remove acetaldehyde. The substances (3) to (5) alone have also a problem in the ability to remove acetaldehyde, and must be used actually together with a toxic alkaline substance, as disclosed, for example, in Japanese Patent Application Kokai (Laid-open) No. 62-40273, and also have such a problem that they are disagreeable odor sources by themselves. The substances (6) to (11) are highly toxic by themselves and also have such a problem that they are disagreeable odor sources. The substance (12) is high in the cost and also has such a problem as an amine odor.

SUMMARY OF THE INVENTION

An object of the present invention is to provide a food-preserving agent which comprises an oxygen absorbent and a substance that is low in the cost, high in the safety, free from a disagreeable odor and high in the ability to remove acetaldehyde by itself, and a food-preserving agent which comprises the oxygen absorbent, the substance that is high in the ability to remove acetaldehyde, and an ethanol-containing substance, and a method for preserving food with the food-preserving agent.

As a result of investigating substances that are low in the cost, high in the safety, free of disagreeable odor and high in the ability to remove acetaldehyde without impairing the ability of an oxygen absorbent to absorb oxygen, the present inventors have found that a compound represented by the following structural formula (I) can meet the requirements.

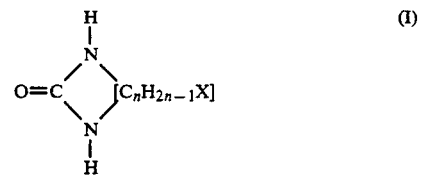

wherein n is an integer of 2 to 4, and X is H or $CH_3$.

The first aspect of the present invention provides a food-reserving agent, which comprises an oxygen absorbent and a compound represented by the foregoing structural formula (I) as a substance capable of removing acetaldehyde.

The second aspect of the present invention provides a food-preserving agent, which comprises an ethanol-containing substance, an oxygen absorbent and a compound represented by the foregoing structural formula (I) as a substance capable of removing acetaldehyde.

The third aspect of the present invention provides a method for preserving food, which provides a food and a food-preserving agent comprising an oxygen absorbent and a compound represented by the foregoing structural formula (I) as a substance capable of removing acetaldehyde in a sealed package.

The fourth aspect of the present invention provides a method for preserving food, which provides a food and a food-preserving agent comprising an ethanol-containing substance, an oxygen absorbent and a compound represented by the foregoing structural formula (I) as a substance capable of removing acetaldehyde in a food-containing sealed package.

DETAILED DESCRIPTION OF THE INVENTION

Ethanol-containing substance for use in the present invention is not particularly limited, so long as it can contain ethanol, and includes, for example, ethanol-containing carriers such as ethanol-containing activated carbon, silicon dioxide, diatomaceous earth, clay, celite, pearlite, zeolite, paper, cloth, cotton, etc.

Such an ethanol content of the ethanol-containing substance that the concentration of transpired ethanol in the sealed package can satisfy the preservation of the food in the sealed package is enough, but also depends on the kind and the amount of food to be preserved. Usually, one part by weight of ethanol is contained in 100 parts by weight of a carrier.

Oxygen absorbent for use in the present invention is not particularly limited, so long as it can remove oxygen from air by oxidation reaction, adsorption, absorption, etc., and includes, for example, iron powder, ascorbic acid and erythorbic acid or their salts; unsaturated fatty acids and their salts or esters; catechol; and gallic acid and its salts or esters.

Acetaldehyde to be removed according to the present invention is not limited only to the acetaldehyde generated by contact of coexisting ethanol vapors or liquid with an oxygen absorbent and the resulting oxidation of ethanol, but also includes acetaldehyde generated by other factors. For example, acetaldehyde generated from food itself is included.

Substance capable of removing acetaldehyde for use in the present invention is a cyclic urea derivative represented by the following structural formula (I):

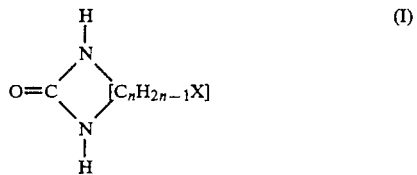

wherein n is an integer of 2 to 4 and X is H or $CH_3$.

The compound represented by the foregoing structural formula ( I ) includes, for example, 5-membered 2-imidazolidone and 4-methyl-2-imidazolidone, 6-membered 2-oxy-hexahydropyrimidine and 7-membered 2-oxy-1,3-diazepane.

A procedure for mixing an ethanol-containing substance, an oxygen absorbent and a substance capable of removing acetaldehyde is not particularly limited, so long as it can conduct uniform mixing. The substance capable of removing acetaldehyde may be mixed in a powdery state, or dissolved in a solvent such as water or ethanol, followed by impregnation of a carrier with the solution and mixing with other component. At least one part by weight, preferably at least 2 parts by weight, of the substance capable of removing acetaldehyde is mixed with 100 parts by weight of a mixture of the ethanol-containing substance and the oxygen absorbent.

In the present invention, a food-preserving agent comprising an ethanol-containing substance, an oxygen absorbent and a substance capable of removing acetaldehyde is encased in a small bag of gas-permeable package material which can freely permeate a gas such as oxygen, ethanol or acetaldehyde, and used. The food-preserving agent encased in the small bag is used together with food for the preservation of food contained in a non-gas permeable, sealed package.

DESCRIPTION OF THE PREFERRED EMBODIMENTS

The present invention will be described in detail below, referring to Examples.

EXAMPLE 1

100 parts by weight of iron powder, 2 parts by weight of calcium chloride and 0.5 parts by weight of activated carbon were mixed together in a mortar to prepare an oxygen absorbent. 133 parts by weight of zeolite was impregnated with 65 parts by weight of 99.5% ethanol to prepare an ethanol-containing substance. 2-imidazolidone and 2-oxy-1,3-diazepane were used as substances capable of removing acetaldehyde.

At first, 1.0 g of the oxygen absorbent, 0.9 of the ethanol-containing substance and 0.1 g of powder of the substance capable of removing acetaldehyde were weighed out, encased in a perforated small bag with dimensions of 45×40 mm, made from Japanese paper lined with polyethylene, heat sealed and gently shaked for mixing to prepare a food-preserving agent.

Then, defatted cotton containing 10 ml of water and the thus prepared food-preserving agent were placed together with 250 ml of air in a so said KON package made from a non-gas permeable lamination film of vinylidene chloride-coated nylon/polyethylene and immediately heat sealed. The KON package was left standing at 25° C., and ethanol vapors, residual oxygen and acetaldehyde were quantitatively analyzed by gas chromatograph day by day.

Beside the foregoing samples, samples containing urea and urea derivatives such as N-methylurea, 1,3-dimethylurea, 1,1-dimethylurea, tetramethylurea, ethylurea, 1,3-diethylurea, 1,1-diethylurea, tetraethylurea and n-butylurea as substances capable of removing acetaldehyde, respectively, in place of 2-imidazolidone and 2-oxy-1,3-diagepane were prepared for comparison in the same manner as above. Furthermore, a sample containing lysine hydrochloride alone as an example of amino acid as a substance capable of removing acetaldehyde, and another sample containing lysine hydrochloride and sodium carbonate were prepared for comparison in the same manner as above. Still furthermore, a sample containing amberlite IRA-45 as an example of weakly basic ion exchange resin as a substance capable of removing acetaldehyde was prepared in the same manner as above. All of these samples were tested. The samples are summarized in Table 1 together with the amounts of the respective samples used, and the results are shown in Table 2, where AcH stands for acetaldehyde and EtOH for ethanol.

TABLE 1

| Sample No. | Substance capable of removing acetaldehyde | Amount |
|---|---|---|
| 1 | 2-imidazolidone | 0.1 g |
| 2 | 2-oxy-1,3-diazepane | 0.1 g |
| 3 | Urea | 0.1 g |
| 4 | N-methylurea | 0.1 g |
| 5 | 1,3-dimethylurea | 0.1 g |
| 6 | 1,1-dimethylurea | 0.1 g |
| 7 | Tetramethylurea | 0.1 g |
| 8 | Ethylurea | 0.1 g |
| 9 | 1,3-diethylurea | 0.1 g |
| 10 | 1,1-diethylurea | 0.1 g |
| 11 | Tetraethylurea | 0.1 g |
| 12 | n-butylurea | 0.1 g |
| 13 | Lysine hydrochloride | 0.1 g |
| 14 | Lysine hydrochloride/sodium carbonate | 0.1 g/0.1 g |
| 15 | Ambelite IRA-45 | 0.1 g |
| 16 | None | |

TABLE 2

| Sample No. | Analysis at the time after: | $O_2$ | AcH | EtOH |
|---|---|---|---|---|
| 1 | 1st day | <0.1% | 5 ppm | 3318 ppm |
|   | 2nd day | <0.1% | 2 ppm | 3433 ppm |
|   | 3rd day | <0.1% | 0 ppm | 3000 ppm |
| 2 | 1st day | <0.1% | 20 ppm | 3420 ppm |
|   | 2nd day | <0.1% | 15 ppm | 3380 ppm |
|   | 3rd day | <0.1% | 8 ppm | 3100 ppm |

TABLE 2-continued

| Sample No. | Analysis at the time after: | O$_2$ | AcH | EtOH |
|---|---|---|---|---|
| 3 | 1st day | <0.1% | 258 ppm | 3369 ppm |
|   | 2nd day | <0.1% | 210 ppm | 3000 ppm |
|   | 3rd day | <0.1% | 200 ppm | 3098 ppm |
| 4 | 1st day | <0.1% | 246 ppm | 3465 ppm |
|   | 2nd day | <0.1% | 319 ppm | 3483 ppm |
|   | 3rd day | <0.1% | 303 ppm | 3077 ppm |
| 5 | 1st day | <0.1% | 280 ppm | 3179 ppm |
|   | 2nd day | <0.1% | 308 ppm | 3433 ppm |
|   | 3rd day | <0.1% | 259 ppm | 3017 ppm |
| 6 | 1st day | <0.1% | 430 ppm | 3099 ppm |
|   | 2nd day | <0.1% | 453 ppm | 3230 ppm |
|   | 3rd day | <0.1% | 428 ppm | 3189 ppm |
| 7 | 1st day | <0.1% | 374 ppm | 3116 ppm |
|   | 2nd day | <0.1% | 440 ppm | 3639 ppm |
|   | 3rd day | <0.1% | 400 ppm | 3620 ppm |
| 8 | 1st day | <0.1% | 369 ppm | 2974 ppm |
|   | 2nd day | <0.1% | 419 ppm | 3298 ppm |
|   | 3rd day | <0.1% | 400 ppm | 3141 ppm |
| 9 | 1st day | <0.1% | 340 ppm | 3000 ppm |
|   | 2nd day | <0.1% | 380 ppm | 3230 ppm |
|   | 3rd day | <0.1% | 350 ppm | 3125 ppm |
| 10 | 1st day | <0.1% | 350 ppm | 3123 ppm |
|   | 2nd day | <0.1% | 395 ppm | 3289 ppm |
|   | 3rd day | <0.1% | 368 ppm | 3093 ppm |
| 11 | 1st day | <0.1% | 550 ppm | 3233 ppm |
|   | 2nd day | <0.1% | 620 ppm | 3302 ppm |
|   | 3rd day | <0.1% | 611 ppm | 3155 ppm |
| 12 | 1st day | <0.1% | 262 ppm | 3112 ppm |
|   | 2nd day | <0.1% | 313 ppm | 3349 ppm |
|   | 3rd day | <0.1% | 300 ppm | 3229 ppm |
| 13 | 1st day | <0.1% | 550 ppm | 3542 ppm |
|   | 2nd day | <0.1% | 480 ppm | 3505 ppm |
|   | 3rd day | <0.1% | 420 ppm | 3480 ppm |
| 14 | 1st day | <0.1% | 93 ppm | 3499 ppm |
|   | 2nd day | <0.1% | 65 ppm | 3550 ppm |
|   | 3rd day | <0.1% | 62 ppm | 3425 ppm |
| 15 | 1st day | <0.1% | 40 ppm | 3663 ppm |
|   | 2nd day | <0.1% | 23 ppm | 3457 ppm |
|   | 3rd day | <0.1% | 20 ppm | 3377 ppm |
| 16 | 1st day | <0.1% | 600 ppm | 3524 ppm |
|   | 2nd day | <0.1% | 640 ppm | 3647 ppm |
|   | 3rd day | <0.1% | 635 ppm | 3324 ppm |

As is obvious from Table 2, the substances capable of removing acetaldehyde according to the present invention have a remarkable effect, as compared with the conventional substances.

EXAMPLE 2

Samples each containing 0.025 g, 0.05 g, 0.10 g, 0.20 g of 2-imidazolidone as a substance capable of removing acetaldehyde were prepared as food-preserving agents in the same manner as in Example 1.

Furthermore, the thus prepared food-preserving agents were placed in individual KON bags each together with defatted cotton containing 10 ml of water and 250 ml of air in the same manner as in Example 1, and ethanol vapors, residual oxygen and acetaldehyde were quantitatively analyzed by gas chromatograph day by day.

Amounts of 2-imidazolidone in the respective samples are shown in Table 3 and the results in Table 4.

TABLE 3

| Sample No. | Amount of 2-imidazolidone (g) | Ratio of oxygen absorbent ethanol-containing substance/2-imidazolidone (by weight) |
|---|---|---|
| 16 | 0.0 | 100/0 |
| 17 | 0.025 | 100/1.3 |
| 18 | 0.050 | 100/2.6 |
| 1 | 0.100 | 100/5.2 |
| 19 | 0.200 | 100/10.4 |

TABLE 4

| Sample No. | Analysis at the time after: | O$_2$ | AcH | EtOH |
|---|---|---|---|---|
| 16 | 1st day | <0.1% | 667 ppm | 3524 ppm |
|   | 2nd day | <0.1% | 652 ppm | 3647 ppm |
|   | 3rd day | <0.1% | 680 ppm | 3324 ppm |
| 17 | 1st day | <0.1% | 109 ppm | 3154 ppm |
|   | 2nd day | <0.1% | 115 ppm | 3230 ppm |
|   | 3rd day | <0.1% | 105 ppm | 3189 ppm |
| 18 | 1st day | <0.1% | 17 ppm | 3214 ppm |
|   | 2nd day | <0.1% | 22 ppm | 3365 ppm |
|   | 3rd day | <0.1% | 24 ppm | 3188 ppm |
| 1 | 1st day | <0.1% | 5 ppm | 3318 ppm |
|   | 2nd day | <0.1% | 2 ppm | 3433 ppm |
|   | 3rd day | <0.1% | 0 ppm | 3000 ppm |
| 19 | 1st day | <0.1% | 0 ppm | 3127 ppm |
|   | 2nd day | <0.1% | 0 ppm | 3333 ppm |
|   | 3rd day | <0.1% | 0 ppm | 3232 ppm |

As is obvious from Table 4, at least one part by weight of 2-imidazolidone as a substance capable of removing acetaldehyde per 100 parts by weight of the total of the oxygen absorbent and the ethanol-containing substance has a considerable effect on acetaldehyde removal, and it is practically preferable to use at least 2 parts by weight of 2-imidazolidone.

EXAMPLE 3

23 parts by weight of 2-oxy-1,3-diazepane as a substance capable of removing acetaldehyde was dissolved in 65 parts by weight of ethanol, and 135 parts by weight of zeolite was impregnated with the resulting solution. Then, from 1 g of the thus impregnated zeolite and 1 g of the oxygen absorbent of Example 1 was prepared a food-preserving agent in the same manner as in Example 1.

Then, the thus prepared food-preserving agent, defatted cotton containing 10 ml of water and 250 ml of air were filled in a KON bag in the same manner as in Example 1, and ethanol vapors, residual oxygen and acetaldehyde were quantitatively analyzed by gas chromatograph day by day. The results are shown in Table 5 together with the results of Sample No. 2.

TABLE 5

| Sample No. | Analysis at the time after: | O$_2$ | AcH | EtOH |
|---|---|---|---|---|
| 20 | 1st day | <0.1% | 18 ppm | 3328 ppm |
|   | 2nd day | <0.1% | 14 ppm | 3169 ppm |
|   | 3rd day | <0.1% | 8 ppm | 3243 ppm |
| 2 | 1st day | <0.1% | 20 ppm | 3420 ppm |
|   | 2nd day | <0.1% | 15 ppm | 3380 ppm |
|   | 3rd day | <0.1% | 8 ppm | 3100 ppm |

As is obvious from Table 5, 2-oxy-1,3-diazepane as a substance capable of removing the generated acetaldehyde has the same effect on the acetaldehyde removal, irrespective of use of it as powder or as a solution in ethanol.

EXAMPLE 4

From 0.1 g of 2-imidazolidone as a substance capable of removing acetaldehyde and 1.9 g of the oxygen absorbent of Example 1 was prepared a food-preserving agent in the same manner as in Example 1. For comparison, a food-preserving agent containing no 2-imidazolidone was also prepared.

The thus prepared food-preserving agents were placed into the respective KON bags each together with 100 g of a sponge cake containing 1.9 g of ethanol and 2.5 g of water, and 250 ml of air, and ethanol vapors, residual oxygen and acetaldehyde were qualitatively analyzed by gas chromatograph after the first day, the third day and the fifth day.

The compositions of the sample are given in Table 6 and the results are shown in Table 7.

TABLE 6

| Sample No. | Composition of food-preserving agent |
|---|---|
| 21 | (2-imidazolidone/oxygen absorbent) = 0.1/1.9 by weight |
| 22 | Only oxygen absorbent |

TABLE 7

| Sample No. | Analysis at the time after: | $O_2$ | AcH | EtOH |
|---|---|---|---|---|
| 21 | 1st day | <0.1% | 2 ppm | 8953 ppm |
|  | 3rd day | <0.1% | 0 ppm | 9537 ppm |
|  | 5th day | <0.1% | 0 ppm | 9656 ppm |
| 22 | 1st day | <0.1% | 320 ppm | 8888 ppm |
|  | 3rd day | <0.1% | 380 ppm | 9675 ppm |
|  | 5th day | <0.1% | 362 ppm | 9163 ppm |

As is obvious from Table 7, vapors of the ethanol added to the food as antiseptics were brought into contact with the oxygen absorbent to generate acetaldehyde, giving off a disagreeable odor. A toxicity would be a problem from the hygienic viewpoint in the case of the food-preserving agent containing no 2-imidazolidone, i.e. containing only the oxygen absorbent.

In the case of the food-preserving agent containing 2-imidazolidone, on the other hand, the generated acetaldehyde was removed, and no disagreeable odor was given off. Food preservation with a very high safety could be obtained.

EXAMPLE 5

A food-preserving agent containing 2-oxy-1,3-diazepane as a substance capable of removing acetaldehyde and a food-preserving agent containing no such substance were prepared in the same manner as in Example 4. Then, the thus prepared food-preserving agents were placed into the respective KON bags each together with 100 g of commercially available Hampen (light, puffy cake made of ground fish) in place of the sponge cake of Example 4, and air in the same manner as in Example 4. Residual oxygen and actaldehyde were quantitatively analyzed after the first day, the third day and the fifth day. Compositions of the samples are shown in Table 8 and the results in Table 9.

TABLE 8

| Sample No. | Composition of food-preserving agent |
|---|---|
| 23 | (2-oxy-1,3-diazepane/oxygen absorbent) = 0.1/1.9 by weight |
| 24 | Only oxygen absorbent |

TABLE 9

| Sample No. | Analysis at the time after: | $O_2$ | AcH |
|---|---|---|---|
| 23 | 1st day | <0.1% | 0 ppm |
|  | 3rd day | <0.1% | 0 ppm |
|  | 5th day | <0.1% | 0 ppm |
| 24 | 1st day | <0.1% | 150 ppm |
|  | 3rd day | <0.1% | 179 ppm |
|  | 5th day | <0.1% | 162 ppm |

As is obvious from Table 9, when acetaldehyde was generated from the food itself such as Hampen (light, puffy cake made of ground fish), acetaldehyde existed at a considerably high concentration for a long duration in the case of the food-preserving agent containing no such a substance capable of removing acetaldehyde, and served not only as a disagreeable odor source, but also a toxicity was a problem from the hygienic view point though its transfer into the food.

In the case of the food-preserving agent containing 2-oxy-1,3-diazepane, on the other hand, the generated acetaldehyde was removed and no disagreeable odor was given off. Thus, food preservation with a very high safety could be obtained.

EXAMPLE 6

A food-preserving agent comprising the oxygen absorbent, the ethanol-containing substance and 2-imidazoidone as a substance capable of removing acetaldehyde was prepared in the same manner as in Example 1.

Then, the thus prepared food-preserving agent was placed in a KON bag together with 200 g (4 pieces) of commercially available cut rice cakes containing no ethanol in place of the ethanol-containing sponge cake of Example 4 and air in the same manner as in Example 4, and ethanol vapors, residual oxygen and acetaldehyde were quantitatively analyzed by gas chromatography after the first day, the third day and the fifth day.

In order to determine the transfer of acetaldehyde into the food, the cut rice cakes each after the above-mentioned days were placed in a heat-resistance bottle having a capacity of 1 l, tightly plugged, heated at 100° C. and subjected to gas analysis. The results are shown in Table 10.

TABLE 10

| Sample No. | Analysis at the time after: | $O_2$ | AcH | AcH in food | EtOH |
|---|---|---|---|---|---|
| 25 | 1st day | <0.1% | 0 ppm | 0 ppm | 2604 ppm |
|  | 3rd day | <0.1% | 0 ppm | 0 ppm | 2620 ppm |
|  | 5th day | <0.1% | 0 ppm | 0 ppm | 2888 ppm |

As is obvious from Table 10, the food-preserving agent containing both 2-imidazolidone and ethanol could remove acetaldehyde immediately. Thus, use of the food-preserving agent of the present invention could prevent a disagreeable odor due to acetaldehyde and also could prevent transfer of acetaldehyde having a safety problem into the food. That is, food preservation with a very high safety could be obtained.

The food-preserving agent of the present invention can remove acetaldehyde generated from the simultaneous use of an oxygen absorbent and ethanol or from food itself very effectively at a low cost and without giving off a disagreeable odor at all, and thus can serve to preserve food with a very high safety without any fear of disagreeable odor.

What is claimed is:

1. A food-preserving agent comprising a substance capable of removing oxygen from air and a compound of the formula

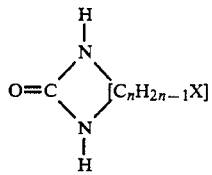
wherein n is an integer of 2 to 4 and X is H or CH$_3$.
2. A food-preserving agent comprising an ethanol-containing carrier, a substance capable of removing oxygen from air and a compound of the formula
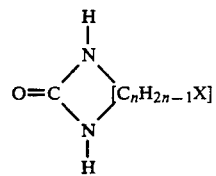
wherein n is an integer of 2 to 4 and X is H or CH$_3$.
* * * * *